United States Patent Office 3,737,482
Patented June 5, 1973

3,737,482
VULCANIZABLE BLEND OF A POLYACRYLATE WITH A BUTADIENE POLYMER
Dale E. Kelly and Charles W. Gerdes, Jr., Bartlesville, Okla., assignors to Phillips Petroleum Company
No Drawing. Filed May 17, 1971, Ser. No. 144,286
Int. Cl. C08f 29/12, 29/50, 33/08
U.S. Cl. 260—876 B    6 Claims

ABSTRACT OF THE DISCLOSURE

A vulcanizable elastomer composition comprising at least one polymerized elastomeric ester of acrylic acid having a weight percent in the range of about 50 to about 95, the ester moiety thereof being an alkyl radical in the range of 1–10 carbon atoms per molecule and another constituent having a weight percent in the range of about 5 to about 50 and being one of a homopolymer of butadiene or a copolymer of butadiene-styrene.

---

It is desirable to provide a vulcanizable elastomer which upon vulcanization by conventional methods known in the art produces a product that has a high hardness, a high tensile strength, a low brittleness at low temperatures, a low elongation set, and a low compression set relative to the properties of heretofore utilized vulcanizable elastomers of polymerized esters of acrylic acid.

The vulcanizable elastomer composition of this invention can be utilized for forming various useful products such as, for example, O-rings, radial shaft seals, gaskets, floor tile, particularly in areas where oil resistance may be necessary, and automotive molded goods.

The vulcanizable elastomer composition of this invention comprising a first constituent of a weight percent in the range of about 50 to about 95. The first constituent is at least one polymerized elastomeric ester of acrylic acid, the ester moiety thereof being an alkyl radical in the range of 1–10 carbon atoms per molecule. The second constituent is of a weight percent in the range of about 5 to about 50. The second consituent is one of a homopolymer of butadiene, a copolymer of butadiene-styrene, or mixtures thereof.

The polymerized elastomeric ester of acrylic acid is preferably in the range of about 55 to about 80 weight percent and is preferably a polymer or copolymer of poly(methylacrylate), poly(ethylacrylate), poly(n-butylacrylate), poly(n-decylacrylate), or blends thereof.

The second constituent can be a homopolymer of butadiene or butadiene-styrene in the form of a copolymer, block copolymer, branched block copolymer or blends thereof having a ratio of butadiene-styrene greater than about 60:40 as shown for example in U.S. 3,476,829. Where the butadiene of the ratio is less than about 60 and the styrene is greater than about 40, the polymer becomes a thermosetting plastic rather than an elastomeric polymer.

The vulcanizable elastomer of this invention can thereafter have various curing materials added thereto and can be further vulcanized as known in the art. The following examples set forth compositions of this invention with results of tests conducted on products that have been cured by conventional methods.

EXAMPLE I

A series of blends of poly(acrylate) rubbers and a polybutadiene homopolymer was prepared using the proportions and ingredients shown in Table I. The blends were mixed on a cold Banbury. The dump temperature is also given in the table.

TABLE I

| Run number | Parts by weight | | | | |
|---|---|---|---|---|---|
| | 1 | 2 | 3 | 4 | 5 |
| Poly(acrylate) rubber [1] | 70 | 85 | 95 | 100 | |
| Polybutadiene rubber [2] | 30 | 15 | 5 | | 100 |
| Carbon black [3] | 40 | 40 | 40 | 40 | 40 |
| Stearic acid | 1 | 1 | 1 | 1 | 1 |
| Zinc oxide | 2.5 | 2.4 | 2.5 | 2.5 | 2.5 |
| 4,4'-dithiodimorpholine [4] | 1.25 | 1.25 | 1.25 | 1.25 | 1.25 |
| Tetramethylthiuram monosulfide [5] | 1.25 | 1.25 | 1.25 | 1.25 | 1.25 |
| Sulfur | 0.20 | 0.20 | 0.20 | 0.20 | 0.20 |
| Mixing time | 4'30" | 4'40" | 4'30" | 4'15" | 5'20" |
| Dump temperature, °F | 305 | 305 | 290 | 290 | 310 |

[1] Cyanacryl R (American Cyanamid).
[2] Solprene 255 (Phillips Petroleum Co.) Mooney ML-4 at 212 °F. = 55–60.
[3] Philblack N550 (Phillips Petroleum Co.).
[4] Sulfasan R Vulcanizing Agent (Monsonat).
[5] Monex Accelerator (Uniroyal Chem. Co.).

The blends were cured at 320° F. for 20–45 minutes and the physical properties determined. The results are in Table II.

TABLE II

| | Curing time, min. | Blend number | | | | |
|---|---|---|---|---|---|---|
| | | 1 | 2 | 3 | 4 | 5 |
| Compression set, percent [1] | 30 | 47.6 | 66.0 | 91.3 | 100.5 | 19.3 |
| | 45 | 46.4 | 61.5 | 87.6 | 101.0 | 18.3 |
| 100% modulus, p.s.i. [2] | 20 | 510 | 420 | 250 | 100 | 350 |
| | 30 | 500 | 435 | 240 | 120 | 375 |
| | 45 | 540 | 450 | 250 | 130 | 390 |
| 200% modulus, p.s.i. [2] | 20 | 1,070 | 710 | 370 | 130 | 825 |
| | 30 | 1,040 | 730 | 390 | 200 | 920 |
| | 45 | 1,130 | 780 | 420 | 215 | 940 |
| Tensile, p.s.i. [2] | 20 | 1,350 | 980 | 900 | 500 | 1,025 |
| | 30 | 1,390 | 1,100 | 1,070 | 960 | 1,100 |
| | 45 | 1,410 | 1,100 | 1,080 | 980 | 1,050 |
| Brittleness, temp., °F. [3] | | 30 | −46 | +2 | +8 | +10 | −94 |
| Shore hardness A [4] | | 30 | 65 | 64 | 61½ | 51 | 65 |
| | | 45 | 65 | 64 | 62 | 51 | 65 |
| Shore hardness A aged 48 hrs. at 300° F. [4] | | 30 | 82 | 82 | 78 | 65 | 76 |

[1] ASTM D 395-67, Method B.
[2] ASTM D 412-62T.
[3] ASTM D 746-64T.
[4] ASTM D 676-59T.

The results show that the brittleness temperature of the poly(acrylate) rubbers is improved by incorporation of polybutadiene rubber. Generally, when a plasticizing polymer is blended into another polymer to improve low temperature characteristics, the other physical properties, such as tensile or modulus are adversely affected. Surprisingly, however, the modulus and tensile properties of the blends are higher than expected of the blend and some of the blends are higher than either component at all cure levels, especially the 70–30 blend. Even the incorporation of only 15 parts of butadiene polymer into the poly(acrylate) polymer effects an improvement in the latter, showing an unpredictable interaction between these two types of rubber.

EXAMPLE II

Another series of blends was prepared in a manner similar to Example I, using different types of rubber.

TABLE III

| | 1 | 2 | 3 |
|---|---|---|---|
| Polyacrylate rubber | 70 | 70 | [3] 100 |
| Copolymer 75/25 butadiene/styrene [1] | 30 | | |
| Copolymer 65/35 butadiene/styrene [2] | | 30 | |
| Carbon black | 40 | 40 | 40 |
| Stearic acid | 1 | 1 | 1 |
| Zinc oxide | 2.5 | 2.5 | 2.5 |
| 4,4'-dithiodimorpholine | 1.25 | 1.25 | 1.25 |
| Tetramethylthiuram monosulfide | 1.25 | 1.25 | 1.25 |
| Sulfur | 0.20 | 0.20 | 0.20 |
| Mixing time | 4'4" | 3'15" | 4'30" |
| Dump temperature | 290 | 300 | 290 |

[1] Solprene 1205 (Phillips Petroleum Co.), a butadiene-styrene block copolymer, Mooney ML-4 at 212° F., 55. Density 0.895.
[2] Solprene 406 (Phillips Petroleum Co.), a butadiene branched block copolymer, Mooney 42–52, density 0.930.
[3] Control.

Samples were cured as before and submitted to testing. The results are tabulated below:

TABLE IV

|  | Cure time, min. |  |  |  |
|---|---|---|---|---|
| Compression set, percent | 30 | 55.2 | 56.1 | 101.0 |
|  | 45 | 53.9 | 54.2 | 94.0 |
| 200% modulus, p.s.i. | 20 | 860 | 800 | 175 |
|  | 30 | 875 | 820 | 190 |
|  | 45 | 930 | 870 | 210 |
| 300% modulus, p.s.i. | 20 | 1,100 | 1,000 | 285 |
|  | 30 | 1,130 | 1,050 | 340 |
|  | 45 | 1,190 | 1,085 | 365 |
| Tensile, p.s.i. | 20 | 1,215 | 1,210 | 890 |
|  | 30 | 1,255 | 1,270 | 1,015 |
|  | 45 | 1,300 | 1,275 | 1,020 |
| Tensile after aging 48 hrs. at 300° F. | 30 | 1,250 | 1,250 | 660 |
| Hardness, Shore A | 30 | 73.5 | 84 | 52 |
|  | 45 | 74.5 | 84 | 51 |

The results are similar to those of Example I and demonstrate the interaction of the two kinds of rubbers. Even after aging at 300° F. for 48 hours, the blends retain their tensile strength whereas the poly(acrylate) rubber has lost nearly 40 percent.

Other modifications and alterations of this invention will become apparent to those skilled in the art from the foregoing discussion and example, and it should be understood that this invention is not to be unduly limited thereto.

What is claimed is:

1. A blended vulcanizable elastomer composition comprising: constituent A having a weight percent in the range of about 50 to about 95 and being at least one polymerized elastomeric ester of acrylic acid with the ester moiety thereof being an alkyl radical in the range of 1–10 carbon atoms per molecule and constituent B having a weight percent in the range of about 5 to about 50 and being one of a homopolymer of butadiene, a copolymer of butadiene-styrene having a ratio of butadiene-styrene greater than about 60:40 or mixtures thereof.

2. A composition, as set forth in claim 1, wherein the weight percent of the polymerized ester of acrylic acid is in the range of about 55 to about 80.

3. A composition, as set forth in claim 1, wherein the polymerized ester of acrylic acid is selected from the group of polymers and copolymers of poly(methylacrylate), poly(ethylacrylate), poly(n-butylacrylate), poly(n-octylacrylate), poly(n-decylacrylate), and blends thereof.

4. A composition, as set forth in claim 1, wherein the constituent B is polybutadiene.

5. A composition, as set forth in claim 1, wherein the butadiene-styrene copolymer is a block copolymer.

6. A composition, as set forth in claim 1, wherein the butadiene-styrene copolymer is a branched block copolymer.

References Cited

UNITED STATES PATENTS

| 3,245,452 | 4/1966 | Scott | 260—887 |
| 2,643,247 | 6/1953 | Fisher et al. | 260—887 |
| 2,857,360 | 10/1958 | Feuer | 260—887 |

FOREIGN PATENTS

| 790,942 | 2/1958 | Great Britain | 260—887 |

SAMUEL H. BLECH, Primary Examiner

U.S. Cl. X.R.

260—23.7 M, 41.5 R, 887